(12) United States Patent
Åström et al.

(10) Patent No.: US 9,007,966 B2
(45) Date of Patent: Apr. 14, 2015

(54) ACCESSING A COMMUNICATIONS NETWORK

(75) Inventors: Bo Åström, Stockholm (SE); Arne Pehrsson, Huddinge (SE); Lennart Norell, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1102 days.

(21) Appl. No.: 12/447,840

(22) PCT Filed: Nov. 3, 2006

(86) PCT No.: PCT/EP2006/068073
§ 371 (c)(1),
(2), (4) Date: Dec. 2, 2009

(87) PCT Pub. No.: WO2008/052598
PCT Pub. Date: May 8, 2008

(65) Prior Publication Data
US 2010/0074154 A1    Mar. 25, 2010

(51) Int. Cl.
| | | |
|---|---|---|
| H04L 12/66 | (2006.01) |
| H04W 4/20 | (2009.01) |
| H04M 7/12 | (2006.01) |
| H04W 4/14 | (2009.01) |
| H04W 80/10 | (2009.01) |
| H04L 29/06 | (2006.01) |

(52) U.S. Cl.
CPC ............... *H04W 4/20* (2013.01); *H04M 7/122* (2013.01); *H04M 7/123* (2013.01); *H04M 7/1235* (2013.01); *H04W 4/14* (2013.01); *H04W 80/10* (2013.01); *H04L 65/1016* (2013.01)

(58) Field of Classification Search
USPC .................................................. 370/353, 328
See application file for complete search history.

(56) References Cited

U.S. PATENT DOCUMENTS

| | | | |
|---|---|---|---|
| 5,752,188 A | 5/1998 | Astrom et al. | |
| 6,330,445 B1 | 12/2001 | Skog et al. | |
| 2005/0018651 A1 | 1/2005 | Yan et al. | |
| 2007/0058788 A1* | 3/2007 | Mahdi et al. | 379/88.17 |
| 2007/0091877 A1* | 4/2007 | Lundin et al. | 370/353 |
| 2010/0135204 A1* | 6/2010 | Witzel et al. | 370/328 |

FOREIGN PATENT DOCUMENTS

| | | |
|---|---|---|
| GB | 2410 855 A | 8/2005 |
| WO | WO 02 102107 A | 12/2002 |
| WO | WO 02/102107 A1 * | 12/2002 |
| WO | WO 2004/112415  * | 6/2003 |
| WO | WO 2004/112415 A | 12/2004 |

* cited by examiner

*Primary Examiner* — Dang Ton
*Assistant Examiner* — Pamit Kaur (57) ABSTRACT

A method and node in a communication network for facilitating access by a client terminal to an IMS service from a non-Session Initiation Protocol (non-SIP) compliant access network such as a circuit-switched network. The node receives a request from the client terminal and in response, allocates to the terminal, a Terminal Adapter from a plurality of Terminal Adapters. The node then sends a message to the client terminal reporting the address of the allocated Terminal Adapter.

15 Claims, 6 Drawing Sheets

ACCESSING A COMMUNICATIONS NETWORK

FIELD OF THE INVENTION

The present invention relates to a method and apparatus for accessing a communications network, and in particular to a method of allocating a Terminal Adapter to allow User Equipment to access an IP Multimedia Subsystem network from a Circuit Switched access network.

BACKGROUND TO THE INVENTION

Unstructured Supplementary Service Data (USSD) is defined in GSM 02.90 (UMTS 22.090) and GSM 03.90 (UMTS 23.090). It is a technology built into Global System for Mobile Communications (GSM) standards for supporting the transmission of information over GSM networks, and can also be used with Universal Mobile Telecommunications Systems (UMTS) technologies. USSD allows text-based user interaction between applications based on a GSM/UMTS Public Land Mobile Network (PLMN) and User Equipment (UE). USSD is used as a "trigger" to invoke services or applications.

Figure 1:
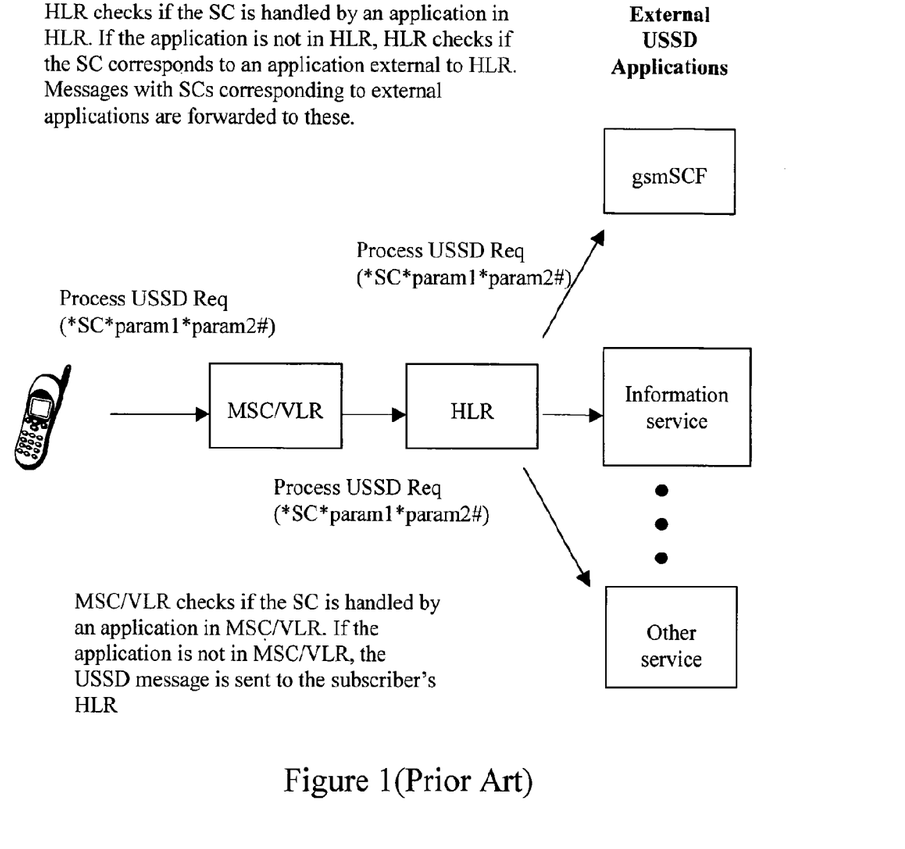
FIG. 1 illustrates schematically an example of a known routing of a USSD message.

A USSD message may be initiated by either the network, the UE (the term UE is herein used as a generic name that incorporates Mobile Stations, MS, and other terminal types) or a subscriber using the UE. In network initiated USSD messages, the network may either request information from the UE, or text strings may be simply sent and displayed to the UE. Referring to FIG. 1, there is illustrated schematically an example of a known routing of a USSD message, as described in 3GPP TS 23.078 and U.S. Pat. No. 5,752,188.

USSD messages contain a Service Code (SC) that identifies the action to be taken on receipt of the USSD message. For UE initiated USSD messages the SC is generated by the UE or the subscriber and includes digits, letters, and/or signs. Any SC that is not recognised by the UE is interpreted as USSD by the UE. SCs that are recognized are mapped to Supplementary Service Operations (SS-Operations) defined in GSM/UMTS, for example Registration/Deregistration/Activation/De-activation, and Interrogation of supplementary service such as Call Forwarding or Call Barring.

Unrecognized SCs are transmitted in USSD messages from the UE to a Mobile Switching Centre (MSC)/Visitor Location Register (VLR) on the network. The MSC/VLR comprises a USSD handler, which analyses the SC. If the USSD handler recognizes the SC, then the action that the SC triggers is performed. That is to say, if an application that corresponds to the SC resides in the MSC/VLR, the USSD handler delivers the USSD to this application.

If the USSD handler at the MSC/VLR does not recognize the SC, the USSD message is forwarded to the subscriber's Home Location register (HLR). The HLR also comprises a USSD handler, which analyses the SC to determine if there is an HLR internal application that corresponds to the SC. The USSD is delivered to this application if there is a match.

If the USSD handler at the HLR does not recognize the SC, the HLR checks the USSD General CAMEL Service Information (UG-CSI) to see if there is an HLR external application that corresponds to the SC. The address to the external node is found in the UG-CSI. The address to the external node may be unique for each subscriber, unique for a group of subscribers, or may be the same for all subscribers using that HLR. The external nodes hosting USSD applications may be, for example, a GSM Service Control Function (gsmSCF), an information service (for example today's news or weather), or a translator between the USSD format over SS7 and a protocol carried over IP (for example a Web Service/SOAP based protocol).

Figure 2:
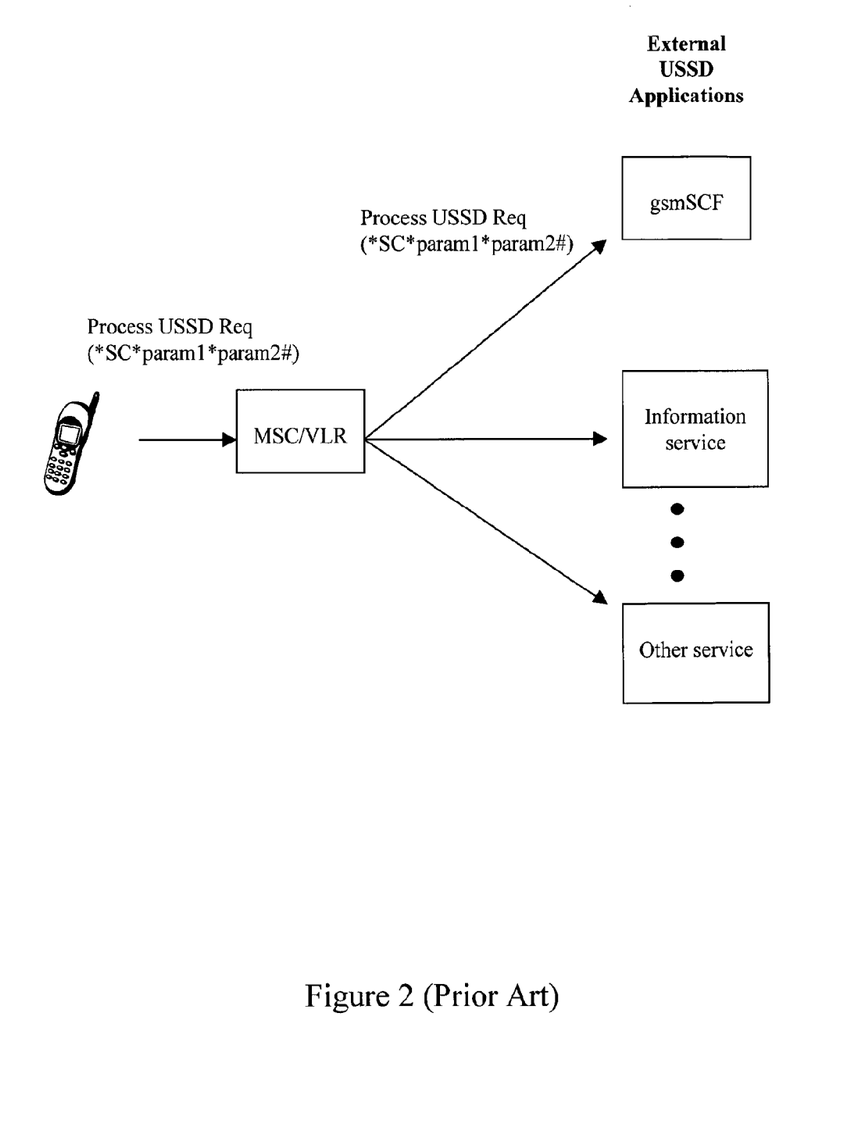
FIG. 2 illustrates schematically a further example of a known routing of a USSD message.

U.S. Pat. No. 6,330,445 describes an optimized routing of USSD, as illustrated in FIG. 2, which allows an MSC/VLR that receives a USSD message to directly route the message to PLMN external nodes.

IMS Centralised Services (ICS) is described in 3GPP Release 8, and enables IMS services to be offered accessed using different types of access network, including Circuit Switched (CS) networks. A Service Engine resides in the IMS network and the CS network is used only to access IMS services. One way to provide access to IMS services from a CS network is to use a Terminal Adapter (TA) that emulates an IMS terminal. The TA communicates with the accessing terminal on one side and the IMS Service Engine on the other side. The TA effectively acts as a gateway between a protocol carried over USSD and the SIP/XCAP signaling used in IMS. So, for example, a TA may "translate" USSD messages into a SIP INVITE message to initiate a session with a peer UE. It is possible for an ICS subscriber to roam into any CS PLMN, which may or may not be ICS capable. It is therefore desirable to allow allocation of a TA to a subscriber both in legacy networks that do not have ICS functionality and in ICS capable networks.

SUMMARY OF THE INVENTION

According to a first aspect of the invention, there is provided a method of facilitating access by a client terminal to an IMS service from a non-Session Initiation Protocol compliant access network, the method comprising:
  receiving a request message from the client terminal;
  in response to receipt of said request message, allocating to the client terminal a Terminal Adapter from a plurality of Terminal Adapters;
  sending to the client terminal a message reporting the address of the allocated Terminal Adapter.

It is preferred that the steps of the method are carried out at a single node.

The non-Session Initiation Protocol compliant access network may be a Circuit Switched access network.

In order to assist allocation of a Terminal Adapter, the request message may contain an identifier that identifies the User Equipment, the method comprising allocating a Terminal Adapter depending upon the identifier. The identifier may be selected from one of an International Mobile Equipment Identity, IMEI, and a Medium Access Control, MAC, address.

The plurality of Terminal Adapters may comprise groups of Terminal Adapters, each group relating to a User Terminal type.

The plurality of Terminal Adapters may comprise groups of Terminal Adapters, each group relating to a service type.

The method preferably comprises, prior to allocating a Terminal Adapter, sending a query to a subscriber database and/or a terminal database; and
  receiving a response from the subscriber database and/or a terminal database; and
  selecting a Terminal Adapter on the basis of the response.

It is preferred that the request message comprises Unstructured Supplementary Service Data, and the Unstructured Supplementary Service Data comprises IP Multimedia Subsystem Centralised Services data.

According to a second aspect of the invention, there is provided a method of routing a message between a client terminal and a Terminal Adapter, the Terminal Adapter providing an interface between a non-Session Initiation Protocol compliant network and an IMS network, the method comprising:

sending a message from the client terminal to an IMS Centralised Services node, said message containing an address of a selected Terminal Adapter; and sending the message from the IMS Centralised Services node to the Terminal Adapter at the Terminal Adapter address.

According to a third aspect of the invention, there is provided a method of routing a message between a client terminal and a Terminal Adapter, the Terminal Adapter providing an interface between a non-Session Initiation Protocol compliant network and an IMS network, the method comprising:

sending a message from the client terminal to a Mobile services Switching Centre/Visitor Location Register;

sending the message from the Mobile services Switching Centre/Visitor Location register to an IMS Centralised Services node at a Home Location Register; and sending the message from the IMS Centralised Services node to the selected Terminal Adapter.

According to a fourth aspect of the invention, there is provided a node in a communications network for allocating a Terminal Adapter to a client terminal, the node comprising:

means for receiving a request message sent from the client terminal;

means for selecting a Terminal Adapter from a plurality of Terminal Adapters;

means for sending a message to the client terminal, the message containing the address of the selected Terminal Adapter.

The request message may contain an identifier that identifies the client terminal; and the means for selecting a Terminal Adapter may use the identifier to select a Terminal Adapter.

The node may further comprise:

means for sending a query to a terminal database and/or a subscriber database;

means for receiving a response from the terminal database and/or a subscriber database;

wherein the means for selecting a Terminal Adapter uses the response to select a Terminal Adapter.

According to a fifth aspect of the invention, there is provided a Mobile services Switching Centre/Visitor Location Register node for use in a mobile communications network, the node comprising:

means for receiving a message from a client terminal, said message containing an address of a Terminal Adapter; and means for sending the message to the addressed Terminal Adapter.

DETAILED DESCRIPTION OF THE PREFERRED EMBODIMENTS

Figure 3:
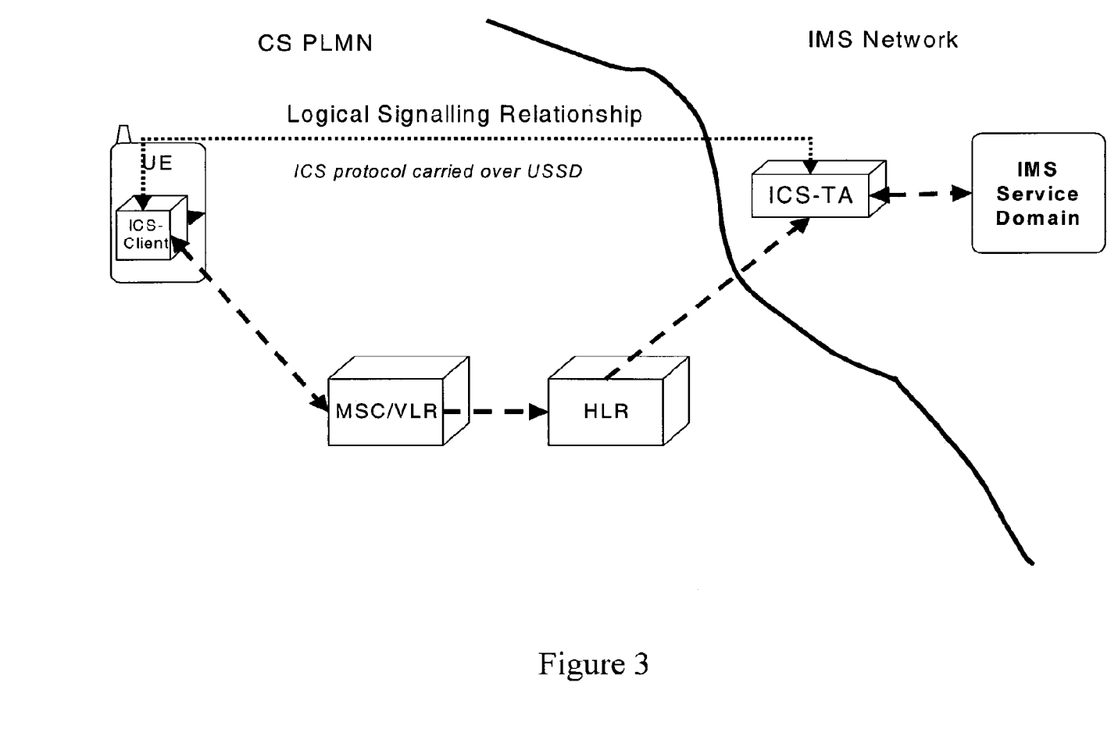
FIG. 3 illustrates schematically an access network which uses a Terminal Adapter to access an IMS network.

Referring to FIG. 3, there is illustrated schematically a Circuit Switched (CS) access network which uses a Terminal Adapter (TA) to access an IMS network. User Equipment (UE) acting as an IMS Centralised Services (ICS) Client in a CS Public Land mobile Network (PLMN) transmits a message via a Mobile services Switching Centre (MSC)/Visitor Location register (VLR) and then a Home Location Register (HLR) to an ICS-Terminal Adapter (TA) in, or at the border of an IMS network. All communications between the UE and the IMS network are via the ICS-TA.

It is desirable to allocate TAs dynamically when they are needed. To achieve this, a pool of TAs are required, from which TAs are allocated to subscribers/terminals when signalling takes place. A static allocation is more expensive compared to a dynamic allocation, as TAs may have long periods of inactivity and so would not be efficiently used.

Subscribers may subscribe to different services and access the IMS services using terminals having a range of capabilities. It is therefore advantageous to allocate TAs to subscribers/terminals depending on the type of terminal and services that need to be supported. Advanced terminals with support for the latest ICS specification would, for example, require a more advanced TA than simpler terminals. Subscribers having subscribed to an advanced IMS service portfolio will likewise require a more advanced TA. Future services and capabilities may require additional TA functionality. As different services and terminals may be used, TAs are grouped together in pools depending on the functionality required of them. A TA is allocated to a subscriber/terminal on the basis of their requirements.

Figure 4:
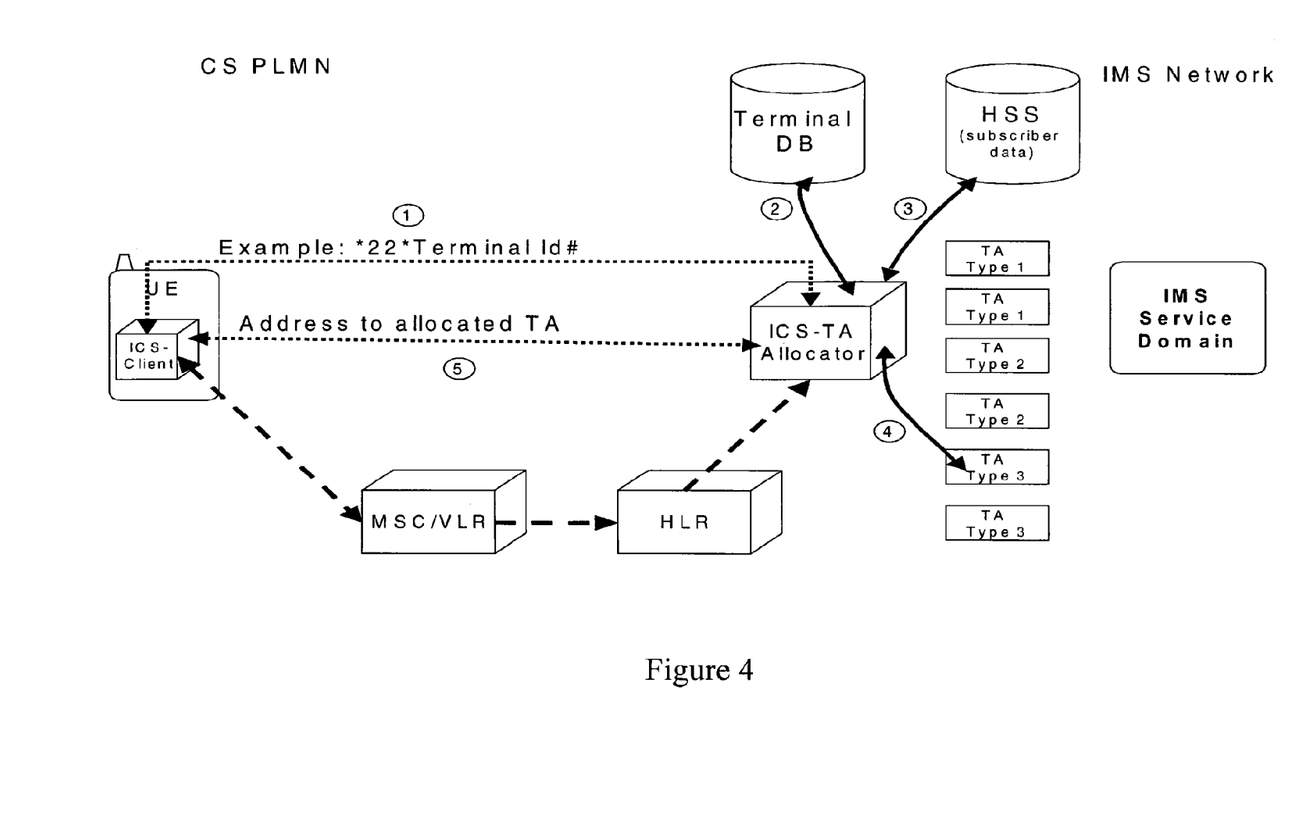
FIG. 4 illustrates schematically allocation of a Terminal Adapter to User Equipment in a Circuit Switched Public Land Mobile Network.

Referring to FIG. 4, there is illustrated schematically allocation of a TA to a UE in a CS-PLMN. The signalling is as follows:

1. An ICS client of the UE sends a request to the network registering its availability for ICS calls. Unstructured Supplementary Service Data (USSD) service Code (SC) 22 is used to indicate this in the example, but it may be any SC value. The request is forwarded to an ISC-TA Allocator using normal USSD routing via an MSC/VLR and HLR.

2. This message is received by a TA-Allocator function. The TA-Allocator checks the terminal ID and the Terminal Id is used to determine what type of TA is required. The terminal ID may, for example, be the International Mobile Equipment Identity (IMEI) received from the terminal. Alternatively, a Medium Access Control (MAC) address may be used as a terminal ID, in which case the terminal will need to retrieve the MAC address prior to sending a message.

3. The TA-Allocator may query external databases such as a Terminal Database or a Subscriber Database such as a Home Subscriber Server (HSS) to determine what type of TA is required, based on, for example, the capabilities of the user Equipment or the services subscribed to by the user. A query towards the HSS may be Non-Transparent Sh, Transparent Sh or both.

4. A TA of a certain type is allocated based on the queries in steps 2 and 3. Allocation of a TA may also depend on the load of the network. The TA-Allocator forwards the HLR-address and/or the MSC/VLR-address to the allocated TA, to allow the allocated TA to initiate subsequent network initiated USSD dialogues.

5. The address of the allocated TA is reported back to the ICS client in the UE.

Once a TA has been allocated to the UE, any messages sent from the ICS client in the UE include the address of the TA. USSD routing to the TA should be performed as efficiently as possible in a CS network with ICS support, and should also be available in networks without ICS support.

Figure 5:
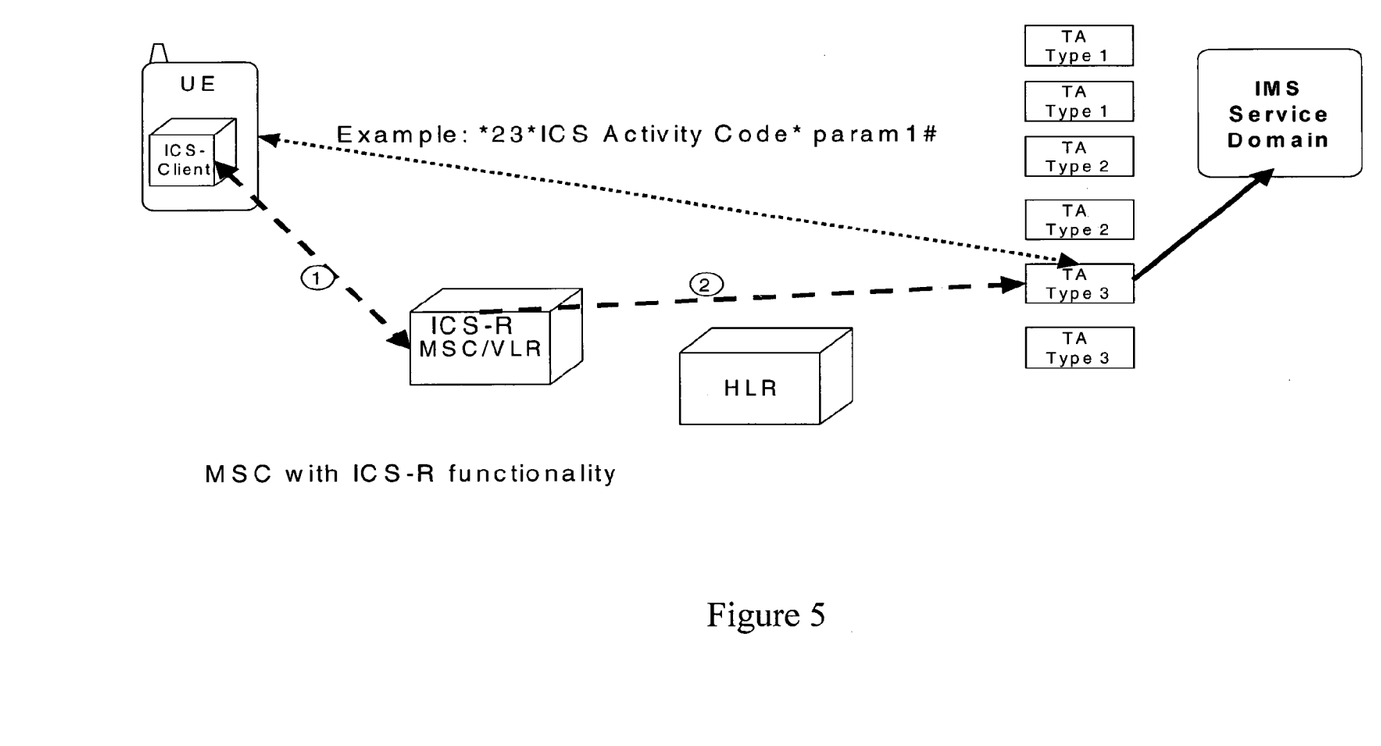
FIG. 5 illustrates schematically the routing of a USSD message from User Equipment to a Terminal Adapter.

FIG. 5 shows the optimized routing where the MSC has been upgraded with ICS-R (ICS Routing) functionality. ICS-R is a USSD application that interprets USSD messages having a specific SC (23 in the example but any SC value may be used). ICS-R takes the TA address in the message that has been inserted by the UE (this is the TA address returned by the TA-Allocator). The TA-address is used by the ICS-R to route the USSD message directly to the TA, without passing the subscriber's HLR. The ICS-R can relay this message either on SS7 or on an IP based protocol, for example Web Service based. In both cases, the MSC address is included to allow the TA to start a network initiated action. By bypassing the HLR, the messaging is sent more efficiently.

The USSD message also contains an ICS activity code and optionally other parameters. These correspond to an ICS protocol carried inside USSD. An ICS Activity could, for example, be "put call on hold", "resume call", "register call forwarding number", etc.

Figure 6:
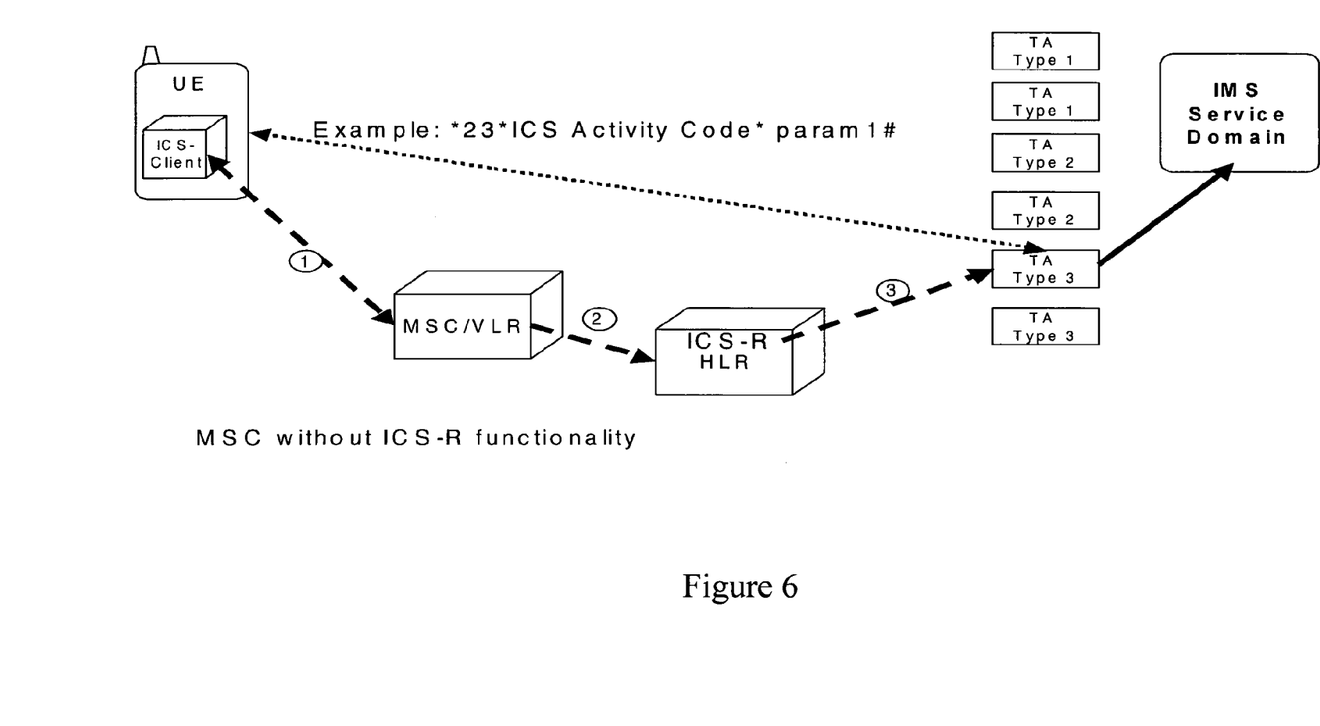
FIG. 6 illustrates schematically an alternative routing of a USSD message from User Equipment to a Terminal Adapter.

USSD routing should also be available in legacy networks that do not have ICS capabilities. Where an MSC/VLR has not been upgraded with ICS-R functionality, normal USSD routing via an HLR is used. When the UE sends a USSD message to the MSC/VLR, and the MSC/VLR does not recognize the USSD message (because it does not recognize the SC), the MSC/VLR forwards the message to the subscriber's HLR. The subscriber's HLR has an ICS-R function, and so is able to interpret the data, and the service code in particular, transferred in the USSD message. The HLR reads the TA-address contained in the message and transfers the USSD message to the TA over SS7 or IP It will be appreciated by persons skilled in the art that various modifications may be made to the embodiments described above without departing from the scope of the present invention. For example, the above description relates to accessing an IMS network from a CS network. However, it may apply to accessing an IMS network from any non-Session Initiation Protocol (SIP) compliant network. Furthermore, whilst the description relates to UE, the invention could apply to any client terminal accessing an IMS network from a non-SIP compliant network.

The invention claimed is:

1. A method in a node of a communication network of facilitating access by a client terminal to a service in an Internet Protocol (IP) Multimedia Subsystem (IMS) network from a non-Session Initiation Protocol compliant access network, the method comprising:

receiving by the node, a request message from the client terminal, wherein the request message includes a terminal identifier associated with capabilities of the client terminal, or a service subscribed to by a user of the client terminal;

in response to receipt of said request message, selecting by the node, a Terminal Adapter from a plurality of Terminal Adapters of different types based on the capabilities of the client terminal, or based on the services subscribed to by the user of the client terminal, wherein the Terminal Adapter provides an interface between the non-SIP compliant access network and the IMS network, and the selected Terminal Adapter is of a type compatible with the capabilities of the client terminal or the services subscribed to by the user of the client terminal;

allocating by the node, the selected Terminal Adapter to the client terminal; and sending from the node to the client terminal, a message reporting an address of the allocated Terminal Adapter.

2. The method according to claim 1, wherein the steps of the method are carried out at a single node.

3. The method according to claim 1, wherein the non-Session Initiation Protocol compliant access network is a Circuit Switched access network.

4. The method according to claim 1, wherein the terminal identifier is selected from one of an International Mobile Equipment Identity (IMEI) and a Medium Access Control (MAC) address.

5. The method according to claim 1, wherein said plurality of Terminal Adapters comprises groups of Terminal Adapters, each group compatible with the capabilities of a client terminal type.

6. The method according to claim 1, wherein said plurality of Terminal Adapters comprises groups of Terminal Adapters, each group compatible with the services subscribed to by the user of the client terminal.

7. The method according to claim 1, further comprising, prior to allocating the Terminal Adapter, the steps of:

sending a query to a subscriber database or a terminal database;

receiving a response from the subscriber database or the terminal database identifying the capabilities of the client terminal or the services subscribed to by the user of the terminal; and selecting the Terminal Adapter on the basis of the response.

8. The method according to claim 1, wherein the request message comprises Unstructured Supplementary Service Data, and the Unstructured Supplementary Service Data comprises IP Multimedia Subsystem Centralized Services data.

9. The method according to claim 1, wherein the step of selecting a Terminal Adapter from a plurality of Terminal Adapters of different types is also based on a load on the network.

10. A method of routing a message between a client terminal in a non-Session Initiation Protocol compliant access network and a Terminal Adapter, the Terminal Adapter providing an interface between the non-Session Initiation Protocol compliant access network and an IP Multimedia Subsystem (IMS) network, the method comprising:

allocating the Terminal Adapter to the client terminal by a Terminal Adapter allocation node, and sending an address of the allocated Terminal Adapter to the client terminal, wherein the Terminal Adapter allocation node is configured to select the Terminal Adapter from a plurality of Terminal Adapters of different types based on capabilities of the client terminal or on services subscribed to by a user of the client terminal, wherein the selected Terminal Adapter is of a type compatible with the capabilities of the client terminal or the services subscribed to by the user of the client terminal;

receiving by an IMS Centralized Services node, a message from the client terminal containing the address of the allocated Terminal Adapter; and sending the message from the IMS Centralized Services node to the allocated Terminal Adapter at the Terminal Adapter address.

11. The method according to claim 10, wherein the IMS Centralized Services node is implemented in a Home Location Register, and the step of receiving the message from the client terminal includes receiving the message in a Mobile services Switching Centre/Visitor Location Register, which forwards the message to the IMS Centralized Services node at the Home Location Register.

12. A node in a communications network for allocating a Terminal Adapter to a client terminal operating in a non-SIP compliant access network, the node comprising:

means for receiving a request message sent from the client terminal, the request message including a terminal identifier associated with capabilities of the client terminal, or a requested service identifier associated with services subscribed to by a user of the client terminal in an Internet Protocol (IP) Multimedia Subsystem (IMS) network;

means for selecting a Terminal Adapter from a plurality of Terminal Adapters of different types based on the capabilities of the client terminal, or based on the services subscribed to by the user of the client terminal, wherein the Terminal Adapter provides an interface between the non-SIP compliant access network and the IMS network, and the selected Terminal Adapter is of a type compatible with the capabilities of the client terminal or the services subscribed to by the user of the client terminal; and means for sending a message to the client terminal, the message containing an address of the selected Terminal Adapter.

13. The node according to claim 12, further comprising:

means for sending a query to a terminal database or a subscriber database; and means for receiving a response from the terminal database or the subscriber database identifying the capabilities of the client terminal or the services subscribed to by the user of the client terminal;

wherein the means for selecting a Terminal Adapter uses the response to select a Terminal Adapter.

14. A Mobile services Switching Centre/Visitor Location Register (MSC/VLR) for use in a mobile communications network, the MSC/VLR comprising:

means for receiving a message from a client terminal operating in a non-SIP compliant access network, said message containing an address of a Terminal Adapter selected from a plurality of Terminal Adapters of different types and allocated to the client terminal based on capabilities of the client terminal or on services subscribed to by a user of the client terminal in an Internet Protocol (IP) Multimedia Subsystem (IMS) network; and means for forwarding the message to the addressed Terminal Adapter.

15. The method according to claim 10, wherein the IMS Centralized Services node is implemented in a Mobile services Switching Centre/Visitor Location Register, and the Mobile services Switching Centre/Visitor Location Register forwards the message directly to the allocated Terminal Adapter at the Terminal Adapter address while bypassing a Home Location Register.

* * * * *